(12) United States Patent
Zhao et al.

(10) Patent No.: US 9,788,648 B2
(45) Date of Patent: Oct. 17, 2017

(54) COLLAPSIBLE BUFFET VEHICLE

(71) Applicant: Deson Trading (Shenzhen) Co., Limited, Shenzhen, Guangdong (CN)

(72) Inventors: Fang Zhao, Guangdong (CN); Jun Liu, Guangdong (CN)

(73) Assignee: Deson Trading (Shenzhen) Co., Limited, Shenzhen (CN)

( * ) Notice: Subject to any disclaimer, the term of this patent is extended or adjusted under 35 U.S.C. 154(b) by 0 days.

(21) Appl. No.: 15/007,146

(22) Filed: Jan. 26, 2016

(65) Prior Publication Data

US 2016/0135591 A1    May 19, 2016

Related U.S. Application Data

(63) Continuation of application No. PCT/CN2014/094015, filed on Dec. 17, 2014.

(30) Foreign Application Priority Data

Oct. 24, 2014  (CN) ..................... 2014 2 0621802 U

(51) Int. Cl.
*A47B 31/04* (2006.01)
*B62B 3/02* (2006.01)
*A47B 31/00* (2006.01)

(52) U.S. Cl.
CPC ............... *A47B 31/04* (2013.01); *B62B 3/02* (2013.01); *A47B 2031/002* (2013.01)

(58) Field of Classification Search
CPC ....... A47B 31/04; A47B 3/002; A47B 3/0912; A47B 3/0918; A47B 3/0803; B62B 3/02; B62B 2205/02; B62B 1/12; B62B 1/20; B62B 1/208
See application file for complete search history.

(56) References Cited

U.S. PATENT DOCUMENTS

| | | | | |
|---|---|---|---|---|
| 3,097,748 | A * | 7/1963 | Drabert ................. | A47B 31/04 108/171 |
| 3,138,122 | A * | 6/1964 | Mondineu .............. | A47B 31/04 108/106 |
| 3,188,158 | A * | 6/1965 | Sanchez ................. | A47B 3/002 108/124 |
| 3,931,985 | A * | 1/1976 | Knebel .................. | B62B 1/208 220/7 |
| 4,323,133 | A * | 4/1982 | Williams ................ | A61G 5/08 180/65.1 |
| 4,522,130 | A * | 6/1985 | Worthington .......... | A47B 31/04 108/159 |
| 4,714,013 | A * | 12/1987 | Telfer ...................... | F24C 1/16 126/9 R |

(Continued)

*Primary Examiner* — Patrick Hawn

(57) ABSTRACT

The present invention relates to dining car technology field, it provides a collapsible buffet vehicle comprising a panel and a plurality of support feet, wherein the panel is detachably mounted on the plurality of support feet. A cross-bar is provided between at least a pair of opposite feet, both ends of the cross-bar being rotatably connected with the pair of opposite feet respectively, the cross-bar comprising at least two motion bars, a joint structure being provided between two neighboring motion bars to make these two motion bars foldable towards each other. The buffet vehicle of according to the present invention can be folded and unfolded by rotating the motion bars in the horizontal plane.

6 Claims, 6 Drawing Sheets

(56) References Cited

U.S. PATENT DOCUMENTS

| | | | | |
|---|---|---|---|---|
| 4,740,010 | A * | 4/1988 | Moskovitz | A47B 31/04 108/170 |
| 4,953,878 | A * | 9/1990 | Sbragia | B62B 3/027 280/30 |
| 6,073,943 | A * | 6/2000 | Serrault | B65F 1/02 280/30 |
| 6,123,207 | A * | 9/2000 | Mast | A47B 43/00 211/149 |
| 6,179,150 | B1 * | 1/2001 | Fogler | B62B 1/14 220/485 |
| 6,431,580 | B1 * | 8/2002 | Kady | B62B 1/12 280/655 |
| 6,443,481 | B1 * | 9/2002 | Stravitz | A47B 31/04 211/201 |
| 6,685,199 | B2 * | 2/2004 | Stravitz | A47B 31/04 211/201 |
| 6,851,564 | B2 * | 2/2005 | Ng | A47B 43/00 108/171 |
| 7,147,243 | B2 * | 12/2006 | Kady | A01K 97/06 280/47.26 |
| 7,278,361 | B2 * | 10/2007 | Zhurong | A47B 3/0912 108/132 |
| 7,748,798 | B2 * | 7/2010 | LeTourneau | A47B 43/00 312/228 |
| 7,921,785 | B1 * | 4/2011 | Shin | A47B 3/0815 108/129 |
| 7,975,625 | B2 * | 7/2011 | Topham | A47B 3/0803 108/115 |
| 8,523,197 | B2 * | 9/2013 | Baatz | A47B 31/04 280/42 |
| 8,820,777 | B1 * | 9/2014 | Pargansky | B62B 3/022 280/651 |
| 9,211,036 | B2 * | 12/2015 | May | A47J 37/0704 |
| 2002/0158446 | A1 * | 10/2002 | Stravitz | A47B 31/04 280/651 |
| 2015/0225004 | A1 * | 8/2015 | Dunford | B62B 3/02 280/42 |

* cited by examiner

COLLAPSIBLE BUFFET VEHICLE

CROSS-REFERENCE TO RELATED APPLICATIONS

This present application is a Continuation Application of PCT application No. PCT/CN2014/094015 filed on Dec. 17, 2014, which claims the benefit of Chinese Patent Application No. 201420621802.X filed on Oct. 24, 2014, the contents of which are hereby incorporated by reference.

TECHNICAL FIELD

The present invention relates to dining car technology field, particularly, it relates to a collapsible buffet vehicle.

BACKGROUND

Many restaurants, banquet halls, outdoor places are provided with buffet service, and among the devices for buffet service there is a buffet vehicle, which is also known as buffet carriage, and can satisfy the requirement for free planning of the dining place and dining style of the buffet. Buffet car has the function of carrying and transferring food, dishes, and the like, and cooking on the spot, so it is one of the indispensable equipments for a hotel banquet hall.

Since the buffet vehicle should be stored after the dinner is finished, a collapsible table mechanism is provided in the industry to save space, as shown in FIG. 1, this type of mechanism includes a table top 10, a pallet 20 and a plurality of support feet 30. In this mechanism, the support feet 30 includes a plurality of unit levers 301, the unit levers 301 are pivotally connected with each other, and the pallet 20 is connected among the unit levers 301. The feet 30 support and fix the table top 10 in the unfolded state, and they are stored between two parts of the table 10 in the folded state. This mechanism can be folded and unfolded by means of the pair of unit levers 301 rotating in the vertical plane relative to each other. Because the buffet vehicle's feet 30 are used to support the table top 10 and the items thereon in its unfolding state, at this time the unit lever 301 bears a lot of pressure and is vulnerable to be automatically folded or other misoperation caused by gravity and pressure. Therefore, the mechanism needs to be unfolded or folded by means of the pallet 20, the trigger part and in particular a firm locking member. Accordingly the above said table mechanism has redundant members and a complex structure, so the materials and processing cost of the buffet vehicle is greatly increased, meanwhile the complex structure also increases the difficulty and time for folding and unfolding.

SUMMARY

The technical problem to be solved by the present application is to provide a collapsible buffet vehicle, so as to solve the problem of the complex structure, high cost for materials and processing existed in the buffet vehicle of the prior art.

The present invention can be achieved as follows: a collapsible buffet vehicle comprising a panel and a plurality of support feet, wherein the panel is detachably mounted on the plurality of support feet, a cross-bar is provided between at least a pair of opposite feet, both ends of the cross-bar being rotatably connected with the pair of opposite feet respectively, the cross-bar comprising at least two motion bars, a joint structure being provided between two neighboring motion bars to make these two motion bars foldable towards each other.

According to an embodiment, the joint structure comprises a connector, a first joint head and a second joint head, each of the first and second joint head being provided with a hinge part and a connection part, wherein each of the connection parts of the first and second joint head is fixedly connected with one of the said motion bars, both of the hinge parts of the first and second joint head are hinged onto the said connector.

According to another embodiment, an open slot is arranged on the connector, the hinge parts of the first and second joint head are embedded into the open slot opposite to each other, the opening direction of the open slot faces the outside of the buffet vehicle.

According to another embodiment, the joint structure further comprises two pin shafts, the top and bottom of the open slot each has two spaced pin holes, wherein the two pin holes on the top are aligned with the corresponding two pin holes on the bottom in vertical direction respectively, each of the first and second joint head has a pin hole, and each of the first and second joint head is hinged onto the connector by means of one pin shaft.

According to yet another embodiment, the buffet vehicle further comprises a locking mechanism comprising a spring and a roll ball; a spring hole for receiving the spring is arranged on the connector, and at least one of the first and second joint head has a roll ball slot corresponding to the spring hole so that the spring can press against the roll ball. The roll ball(s) will be embedded into the roll ball slot when the buffet vehicle is unfolded, and the roll ball(s) will be slipped out of the roll ball slot when the buffet vehicle is folded.

According to another embodiment, the joint structure comprises a first hinge component, a second hinge component and a pin shaft, each of the first and second hinge component being provided with a hinge part and a connection part, wherein both the connection parts of the first and second hinge component are fixedly connected with one of the motion bar respectively, and the hinge parts of the first and second hinge component are hinged with each other via the pin shaft.

According to a preferred embodiment, the buffet vehicle further comprises a locking mechanism comprising a spring and a roll ball; a spring hole for receiving the spring is arranged on the first hinge component, and a roll ball slot corresponding to the spring hole is arranged on the second hinge component so that the spring can press against the roll ball. The roll ball(s) will be embedded into the roll ball slot when the buffet vehicle is unfolded, and the roll ball(s) will be slipped out of the roll ball slot when the buffet vehicle is folded.

According to another embodiment, the buffet vehicle further comprises a hinge structure, wherein both ends of the cross-bar are rotatably connected with a pair of opposite support feet by means of the hinge structure. The hinge structure comprises a hinge base, a hinge head and a pin shaft, wherein the hinge base is fixed to the support feet, the hinge head has a connection part at one end, and a hinge part with a pin hole at the other end, the connection part is connected with the motion bar and fixed thereto. The pin shaft passes through the pin hole and arranged therein. An open slot is arranged on the hinge base, the hinge part of the hinge head is embedded in the open slot, and the hinge part of the hinge head is hinged onto the hinge base via the pin shaft.

According to yet another embodiment, the buffet vehicle can further comprise a baffle which is fixed onto the support feet, the baffle is disposed closes to the outside of the collapsible buffet vehicle compared with the hinge base, and a retaining wall extends from a place corresponding to the open slot to restrict the rotation of the hinge part towards inside of the collapsible buffet vehicle.

According to another embodiment, the buffet vehicle may further comprise a movable laminate, a support bar is provided on the opposite two pairs of the support feet respectively, and the movable laminate is detachably disposed on the support bar.

Compared with the prior art, the beneficial effect of the present application is: the panel of the present invention is detachably mounted onto the support feet, and both ends of the cross-bar are rotatably connected with the support feet, a joint structure is provided between two neighboring motion bars on the cross-bar so that these two motions bars can be folded towards each other, the cross-bar can be folded by folding the motion bars after removing the panel, so as to make the opposite feet close up to each other. The buffet vehicle of according to the present invention can be folded and unfolded by rotating the motion bars in the horizontal plane, as there is no need to set a joint structure on the support feet, the panel and the items thereon can be firmly supported without designing a locking member. Moreover, the buffet vehicle of the present invention has simple structure, low cost, is easy to fold and unfold, the operation efficiency is improved. Meanwhile, the folded buffet vehicle occupies small space, and the panels and the support feet of multiple buffet vehicles can also be stacked at different places, so the storage space can be saved and it is easy to manage, store or transport of these buffet vehicles.

DETAILED DESCRIPTION OF THE INVENTION

Figure 1:
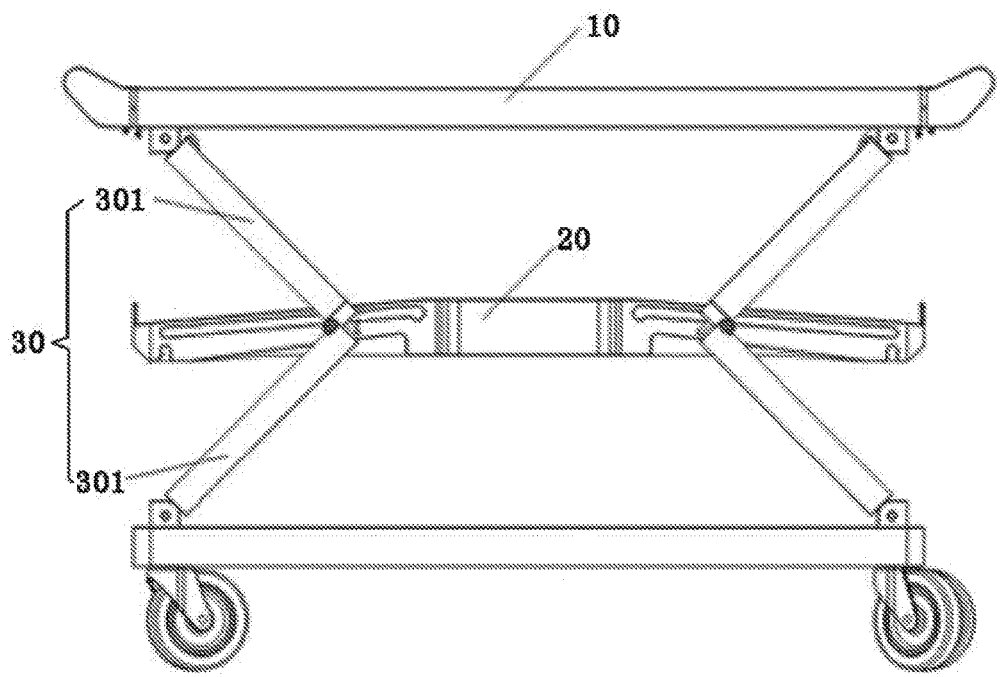
FIG. 1 is a front schematic view of a collapsible table mechanism in the prior art when it is in the folded state.
Figure 2:
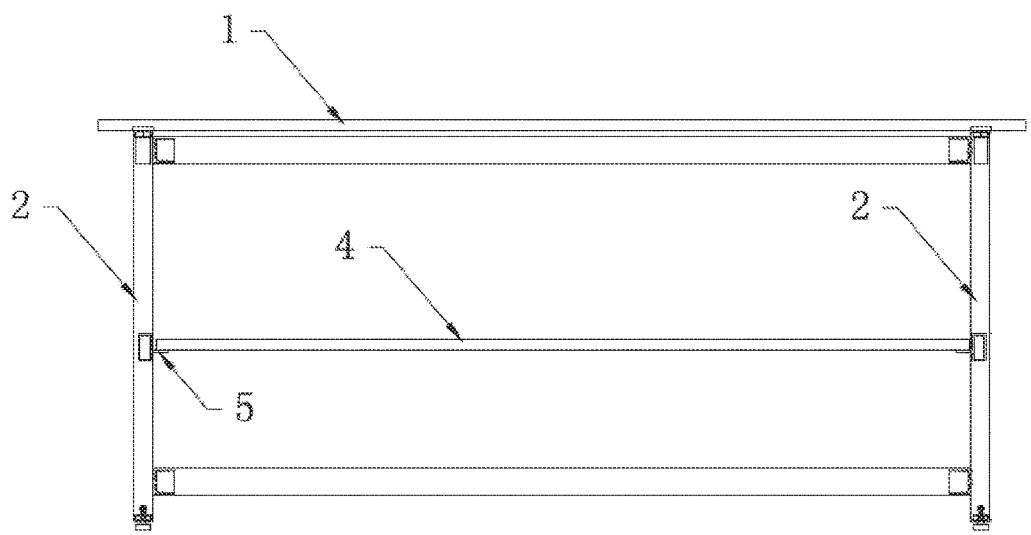
FIG. 2 is a front schematic view of a collapsible buffet vehicle according to an embodiment of the present invention.
Figure 3:
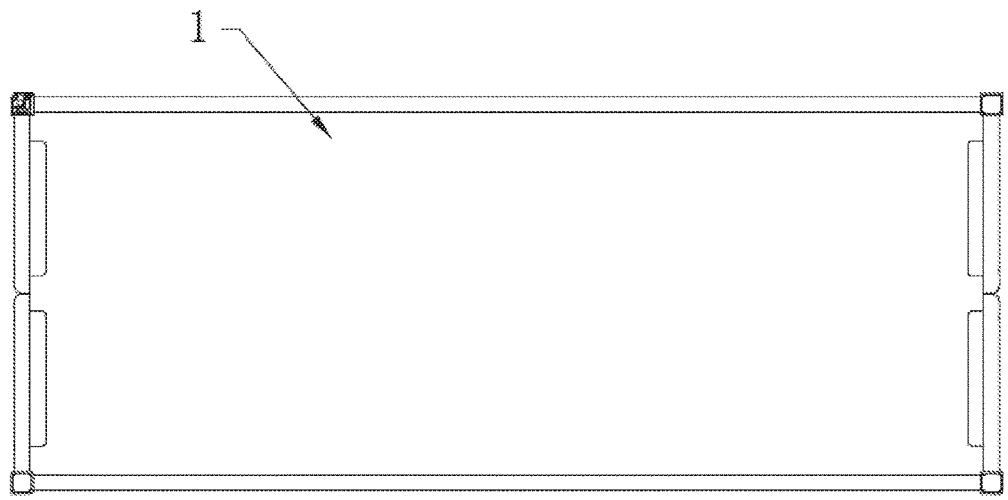
FIG. 3 is a bottom schematic view of the panel in the collapsible buffet vehicle according to the embodiment shown in FIG. 2.
Figure 4:
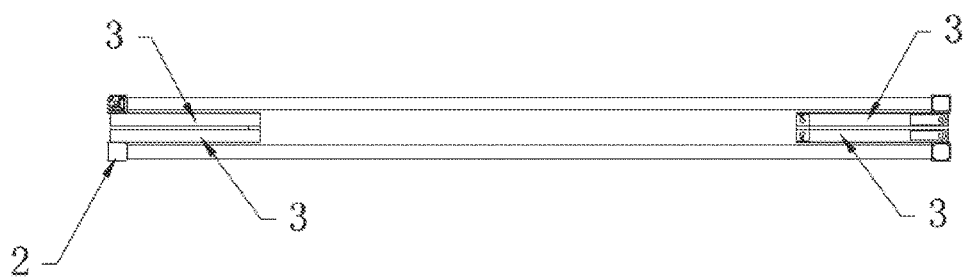
FIG. 4 is a top schematic view of the buffet vehicle shown in FIG. 2 in its folding state.

In order to make the technical problem to be solved by the present invention, technical solution and beneficial effect thereof more clear and apparent, the present invention will be described in further detail in conjunction with the accompanying drawings and embodiments below. It should be understood that the specific embodiments described here are merely for explaining the present invention but not intended to limit the present invention.

Referring to FIGS. 2 to 5, the first embodiment of the present invention is shown, wherein a collapsible buffet vehicle comprising a panel 1 and a plurality of support feet 2 is provided, wherein the panel 1 is detachably mounted on the plurality of support feet 2. A cross-bar 3 is disposed between at least a pair of opposite support feet 2. Both ends of the cross-bar are rotatably connected with the two opposite support feet respectively. The cross-bar 3 comprises at least two motion bars 31, and a joint structure 32 is provided between two neighboring motion bars 31 to render these two motion bars 31 with the ability of folding towards each other. According to the present embodiment, a support feet 2 is provided at each of the four corners of the panel 1, and the two support feet 2 along the width direction of the buffet vehicle are connected by two cross-bar 3 which are spaced in vertical direction.

With reference to FIGS. 5-6 and 7a-7c, the joint structure 32 of the present embodiment includes a connector 321, a first joint head 322, a second joint head 232 and two pin shafts 324. The first joint head 322 has a hinge part 3221 and a connection part 3222, the second joint head 323 also contains a hinge part 3231 and a connection part 3232. The connection parts 3222, 3232 are fixedly connected with one motion bar 31 respectively, and the hinge parts 3221, 3231 are hinged onto the connector 321. An open slot 3211 is arranged on the connect component 321, the hinge parts 3221, 3231 are embedded into the open slot 3221 oppositely with each other, and the opening direction of the open slot 321 faces outside of the buffet vehicle. Each of the top and bottom of the open slot 3211 is arranged with two spaced pin holes 3212, wherein the two pin holes 3212 on the top align with the two pin holes 3121 at the bottom in the vertical direction respectively, a pin hole 3223 is arranged on the first joint head 322, and a pin hole 3233 is arranged on the second joint head 323, and the first and second joint heads 322, 323 are hinged onto the connector 321 via a pin shaft 324.

The panel 1 of the present embodiment is detachably mounted onto the support feet 2, both ends of the cross-bar 3 are rotatably connected with the support feet 2, and a joint structure 32 is provided between two neighboring motion bars 31 on the cross-bar 3 to make these two motion bars foldable towards each other. The cross-bar 3 can be folded by folding the motion bars 31 when the panel 1 is removed, so that the opposite support feet 2 can be closed up. The buffet vehicle of according to the present invention can be folded and unfolded by rotating the motion bars 31 in the horizontal plane, as there is no need to set a joint structure on the support feet 2, the panel 1 and the items thereon can be firmly supported without designing a locking member. Moreover, the buffet vehicle of the present invention has simple structure, low cost, is easy to fold and unfold, the operation efficiency is improved. Meanwhile, the folded buffet vehicle occupies small space, and the panels 1 and the support feet 2 of multiple buffet vehicles can also be stacked at different places, so the storage space can be saved and it is easy to manage, store or transport of these buffet vehicles.

Figure 5:
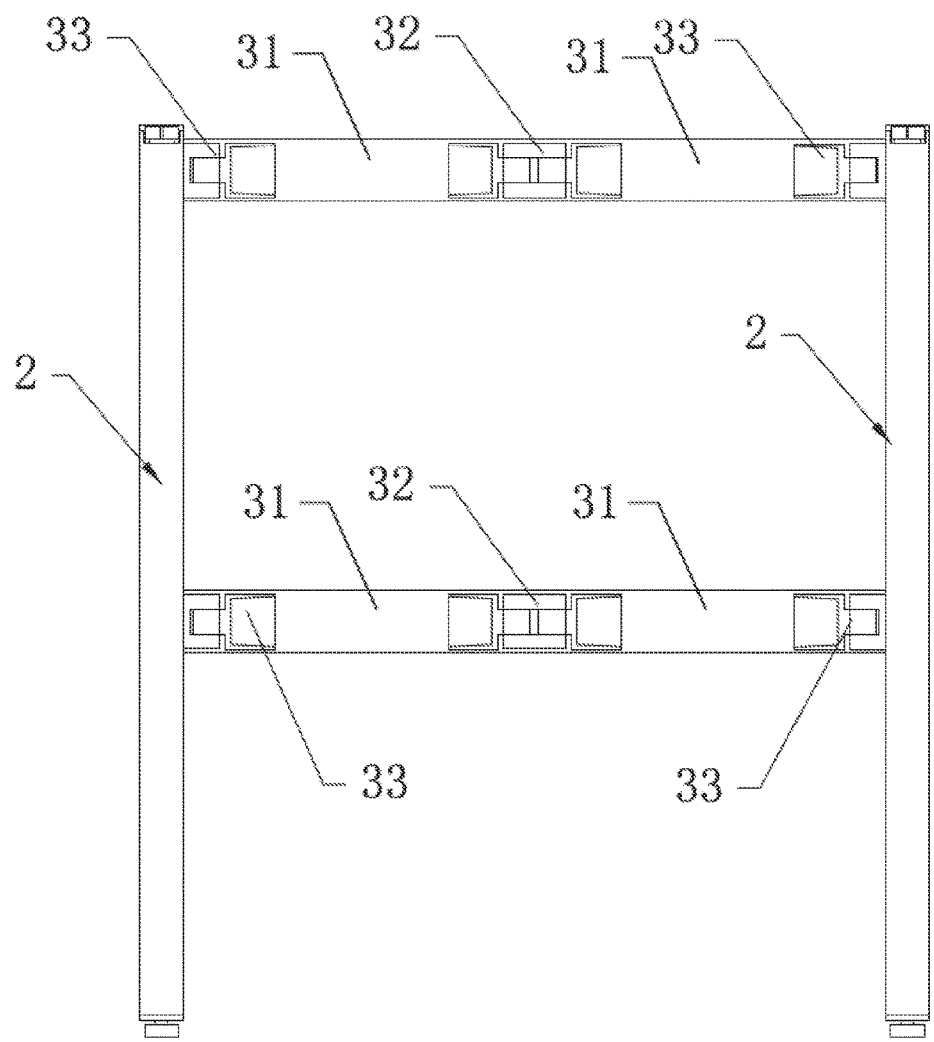
FIG. 5 is a left schematic view of the buffet vehicle shown in FIG. 2 in its unfolded state.
Figure 6:
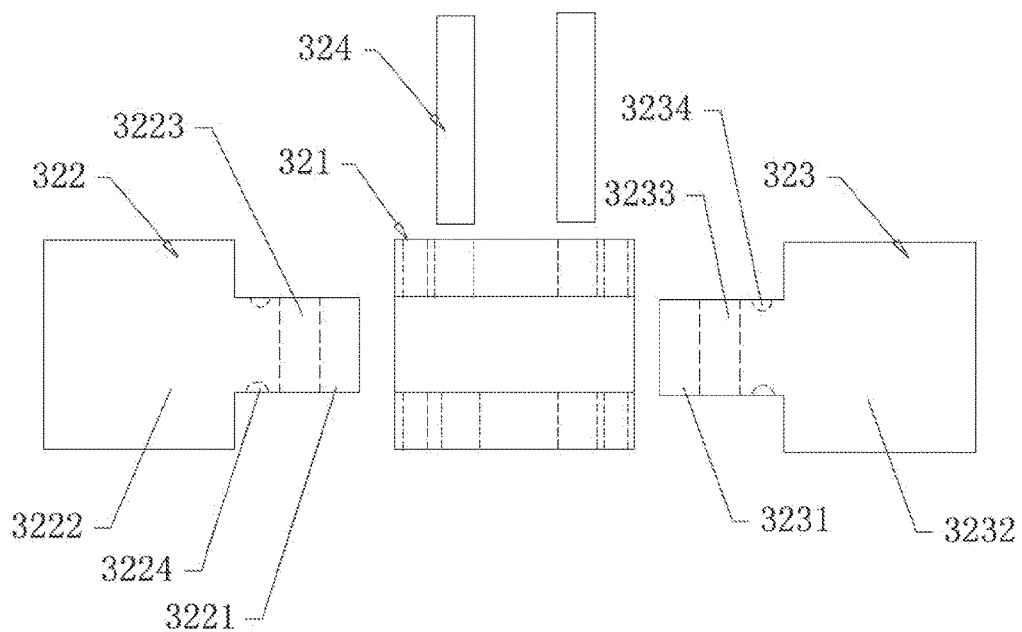
FIG. 6 is an exploded schematic view of the joint structure in the buffet vehicle of FIG. 5.
Figures 7A, 7B, 7C:
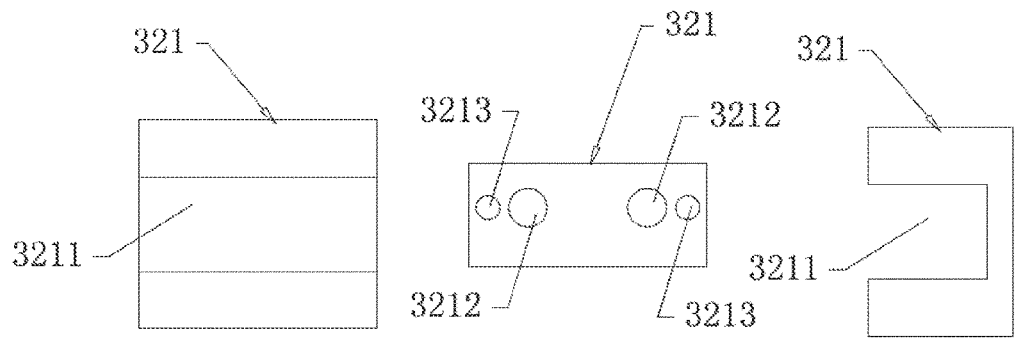
FIGS. 7a, 7b, 7c are front, top, and left schematic views of the connection members of the joint structure in FIG. 6, respectively.
Figure 8:
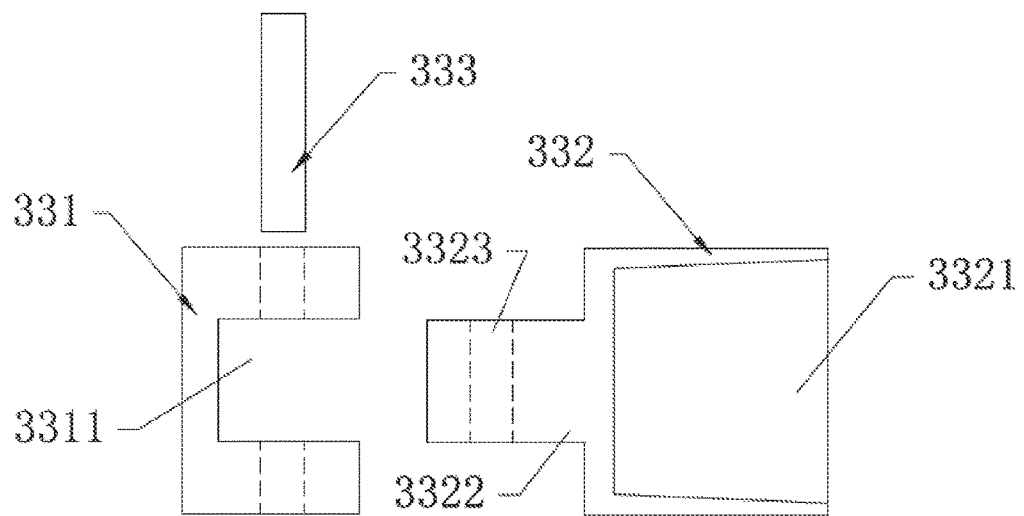
FIG. 8 is an exploded schematic view of the joint structure in the buffet vehicle of FIG. 5.

In particular, with reference to FIG. 5 and FIG. 8, the buffet vehicle of the present embodiment further comprises a hinge structure 33, both ends of the cross bar 3 being rotatably connected with the two opposite feet 2. The hinge structure 33 comprises a hinge base 331, a hinge head 332 and a pin shaft 333. The hinge base 331 is fixed onto the support feet 2, the hinge head 332 has a connection part 3321 at one end, and a connection part 3322 at the other end. The connection part 3221 is connected with the motion bar 31 and fixed thereto, a pin hole 3323 is arranged on the hinge part 3322, the pin shaft 333 passes through the pin hole 3323. An open slot 3311 is arranged on the hinge base 331, the hinge part 3322 of the hinge head 332 is embedded into the open slot 3311, the hinge head 332 is hinged onto the hinge base 331 via the pin shaft 333. Thus, the hinge head 332 can be rotated relative to the hinge base 331.

Further, in order to strengthen the stability of the buffet vehicle in the unfolding state, the buffet vehicle is further provided with a locking mechanism, the locking mechanism comprises a spring and a roll ball (not shown in the figure). The spring hole 3213 for receiving the spring is arranged on the connector 321, the first joint head 322, the second joint head 323 both have ball slots 3224, 3234 corresponding to the spring hole 3213 respectively, accordingly the spring presses against the roll balls. The roll balls are embedded in the ball slots 3224, 3234 when the buffet vehicle is unfolded. When the buffet vehicle needs to be folded, the roll balls will slide out of the ball slots 3224, 3234 by patting the motion bar 31 or the joint structure 32, thus the first joint head 322, the second joint head 323 can rotate with respect to the connector 321.

Figure 9A:
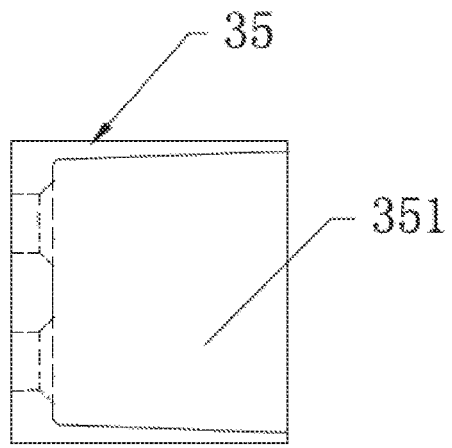
FIGS. 9a, and 9b are front, left schematic views of the baffle in the buffet vehicle according to the embodiment shown in FIG. 2.
Figure 9B:
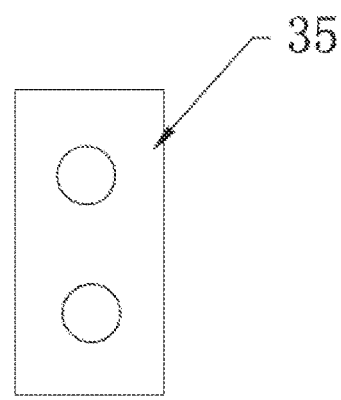

With reference to FIGS. 9a-9b, in order to unify the rotation direction of the motion bar 31 when folding the buffet vehicle, a baffle 35 is fixedly set on the support feet 2 of the buffet vehicle of the present embodiment, the baffle 35 is arranged closer to the outside of the buffet vehicle relative to the hinge base 331, and a retaining wall 351 extends from a place corresponding to the open slot 3311 to restrict the rotation of the hinge part 3322 towards inside of the buffet vehicle. Thus all the motion bars 31 are make sure to be received inside the buffet vehicle, and this further saves the occupation space of the buffet vehicle.

In order to increase the capability of carrying articles of the buffet vehicle, the buffet vehicle of the present embodiment is also provided with an movable laminate 4, the movable laminate 4 is arranged between two pairs of the opposite support feet 2 and connected thereto. A support bar 5 is provided on each of the opposite support feet 2, the movable laminate 4 is placed on the support bar 5, thereby the movable laminate 4 can be removed when the buffet vehicle is folded.

Figure 10:
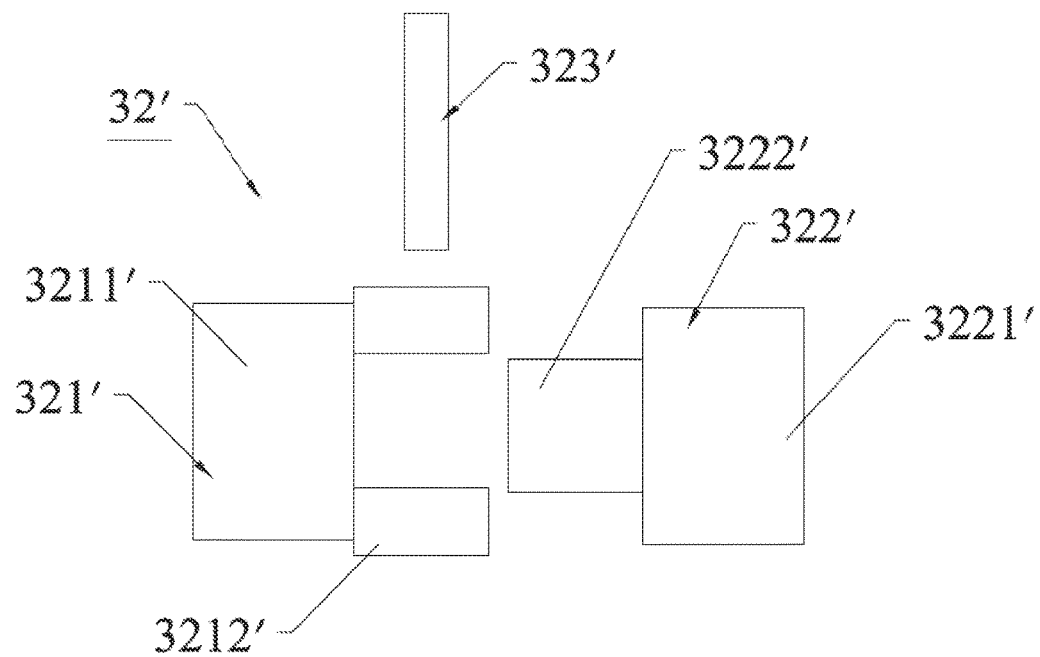
FIG. 10 is an exploded schematic view of the joint structure in the buffet vehicle according to the second embodiment.
Figures 11A, 11B:
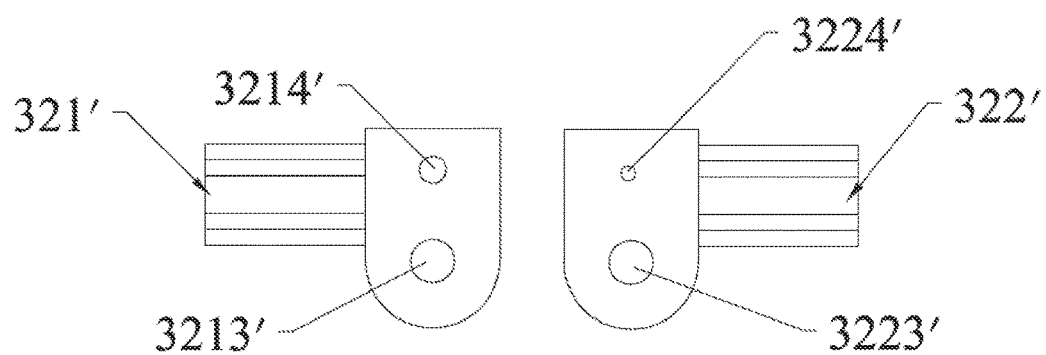
FIG. 11a, and FIG. 11b are top schematic views of the first and second hinge components shown in FIG. 10, respectively.

As shown in FIGS. 10, 11a and 11b, it is the second embodiment of the present invention, the buffet vehicle of the present embodiment is different from the first embodiment only in the joint structure 32', and the other structures and its technical effect are the same with the first embodiment, so will not be further discussed here.

The joint structure 32' of the present embodiment comprises a first hinge component 321', a second hinge component 322' and a pin shaft 323'. The first hinge component 321' is provided with a connection part 3211' and a hinge part 3212', and the second hinge component 322' is also provided with a connection part 3221' and a hinge part 3222'. The connection parts 3211', 3221' are fixedly connected with the motion bar 31 respectively, the pin holes 3213', 3223' are arranged on the hinge parts 3212', 3222', respectively, the hinge parts 3212', 3222' are hinged with each other by means of the pin shaft 323'.

A spring hole 3214' for receiving the spring is arranged on the first hinge part 321', a roll ball slot 3224' corresponding to the spring hole 3214' is arranged on the second hinge component 322', the spring can press against the roll ball. The roll ball is embedded in the roll ball slot 3224' when the buffet vehicle is unfolded, and the roll balls slide out of the roll ball slot 3224' when the buffet vehicle is folded.

The described above is merely the preferred embodiments of the present invention, and it is not intended to limit the present invention, any modifications, equivalent replacement or improvement etc. within the spirit and principle of the present invention should be included in the protection scope of the invention.

The invention claimed is:

1. A collapsible buffet vehicle comprising a panel and a plurality of support feet, wherein the panel is detachably mounted onto the plurality of support feet, a cross-bar is provided between at least one pair of feet opposite to each other, both ends of the cross-bar being rotatably connected with the pair of feet respectively, the cross-bar comprising at least two motion bars, and a joint structure being provided between two neighboring motion bars to make the two motion bars foldable towards each other;

wherein the joint structure comprises a connector, a first joint head and a second joint head, each of the first and second joint heads is provided with a hinge part and a connection part, each of the connection parts of the first and second joint heads is fixedly connected with one of the motion bars, and both the hinge parts of the first and second joint heads are hinged onto the connector; and wherein an open slot is defined in the connector, and the hinge parts of the first and second joint heads are embedded into the open slot opposite to each other, the opening direction of the open slot facing the outside of the buffet vehicle, the hinge parts rotating relative to the connecter towards a center of the open slot to fold the buffet vehicle.

2. The collapsible buffet vehicle of claim 1, wherein the joint structure further comprises two pin shafts, each of a top and a bottom of the open slot has two spaced pin holes, the two pin holes on the top are aligned with the corresponding two pin holes on the bottom in vertical direction respectively, each of the first and second joint heads has a pin hole, and each of the first and second joint heads is hinged onto the connector by means of one pin shaft.

3. The collapsible buffet vehicle of claim 1, wherein the buffet vehicle further comprises a hinge structure, both ends of the cross-bar are rotatably connected with a pair of support feet by means of the hinge structure, the hinge structure comprises a hinge base, a hinge head and a pin shaft, the hinge base is fixed to the support feet, the hinge head has a connection part at one end, and a hinge part with a pin hole at the other end, the connection part is connected with the motion bar and fixed thereto, the pin shaft passes through the pin hole and arranged therein, an open slot is arranged on the hinge base, the hinge part of the hinge head is embedded in the open slot, and the hinge part of the hinge head is hinged onto the hinge base by means of the pin shaft.

4. The collapsible buffet vehicle of claim 3, wherein the buffet vehicle further comprises a baffle which is fixed onto the support feet, the baffle is disposed close to the outside of the collapsible buffet vehicle relative to the hinge base, and a retaining wall extends from a place corresponding to the open slot to restrict the rotation of the hinge part towards inside of the collapsible buffet vehicle.

5. The collapsible buffet vehicle of claim 1, wherein the buffet vehicle further comprises a movable laminate, a support bar is provided on each of opposite two pairs of support feet respectively, and the movable laminate is detachably disposed on the support bar.

6. A collapsible buffet comprising a panel and a plurality of support feet;
   wherein the panel is detachably mounted onto the plurality of support feet, a cross-bar is provided between at least one pair of feet opposite to each other, both ends of the cross-bar being rotatably connected with the pair of feet respectively, the cross-bar comprising at least two motion bars, and a joint structure being provided between two neighboring motion bars to make the two motion bars foldable towards each other;
   wherein the joint structure comprises a first hinge component, a second hinge component and a pin shaft, each of the first and second hinge components is provided with a hinge part and a connection part, both the connection parts of the first and second hinge components are fixedly connected with one of the motion bars respectively, and the hinge parts of the first and second hinge component are hinged with each other via the pin shaft; and
   wherein an open slot is defined in the hinge part of one of the first and second hinge components to receiving the hinge part of the other one of the first and second hinge components, the pin shaft extending the hinge parts of the first and second hinge components to rotatably connect the first and second hinge components.

\* \* \* \* \*